United States Patent [19]
Ichihara

[11] Patent Number: 6,097,713
[45] Date of Patent: Aug. 1, 2000

[54] CDMA MULTI-CODE TRANSMITTER EMPLOYING BASEBAND SIGNAL TIME OFFSET

[75] Inventor: Masaki Ichihara, Tokyo, Japan

[73] Assignee: NEC Corporation, Tokyo, Japan

[21] Appl. No.: 08/988,735

[22] Filed: Dec. 11, 1997

[30] Foreign Application Priority Data

Dec. 17, 1996 [JP] Japan .................................. 8-336935

[51] Int. Cl.[7] .................................................. H04B 7/216
[52] U.S. Cl. ........................ 370/335; 370/342; 375/146
[58] Field of Search ................................... 370/335, 342, 370/320; 375/140, 146, 148

[56] References Cited

U.S. PATENT DOCUMENTS

| | | | |
|---|---|---|---|
| 5,533,013 | 7/1996 | Leppanen | 370/18 |
| 5,995,538 | 11/1999 | Lomp | 375/146 X |

FOREIGN PATENT DOCUMENTS

| | | |
|---|---|---|
| 57199355 | 11/1990 | Japan . |
| 6-77928 | 3/1994 | Japan . |
| 6-244821 | 9/1994 | Japan . |
| 6-292251 | 10/1994 | Japan . |
| 6-318927 | 11/1994 | Japan . |
| 7-50649 | 2/1995 | Japan . |
| 7-221672 | 8/1995 | Japan . |
| 7-336323 | 12/1995 | Japan . |

*Primary Examiner*—Joseph L. Felber
*Attorney, Agent, or Firm*—Ostrolenk, Faber, Gerb & Soffen, LLP

[57] ABSTRACT

In a CDMA multi-code transmitter in which data signals input from a plurality of data channels are spectrum-spread with mutually different spreading codes and resultant baseband signals are summed and transmitted, peak values of an eye-pattern is reduced to reduce power consumption by delaying the baseband signals before summed, such that transmission timings of the respective baseband signals are mutually shifted.

1 Claim, 5 Drawing Sheets

CDMA MULTI-CODE TRANSMITTER EMPLOYING BASEBAND SIGNAL TIME OFFSET

BACKGROUND OF THE INVENTION

1. Field of the Invention

The present invention relates to a Code Division Multiple Access (CDMA) multi-code transmitter for summing a plurality of baseband signals having spread spectra with respective spreading codes and transmitting the summed baseband signals. Particularly, the present invention relates to a reduction of power consumption of a transmitting amplifier of the transmitter in transmitting the signals.

2. Description of Related Art

In the CDMA system, the discrimination of individual channels is realized by not dividing frequency or time but using different spreading codes having small mutual correlations. The channels discriminated by the spreading codes will be referred to as "code channels" hereinafter. Therefore, in the CDMA system, it is possible to transmit signals having spectra spread with a plurality of mutually different spreading codes, that is, multi-code, by using one and the same transmitter in one and the same frequency band at the same time.

FIG. 1 is a block diagram showing a construction of a conventional CDMA multi-code transmitter. In the shown conventional CDMA multi-code transmitter, the spectra of data signals on the respective code channels are spread with different spreading codes and summed simply, as shown in FIG. 1. A transmitting method in a usual CDMA system will be described with reference to FIG. 1. In this description, it should be noted that the Quadrature Phase Shift Keying (Q-PSK) system is used as a modulation system for transmission.

The data signals $0 \sim n$ of the respective channels are input to Serial-to-Parallel (S/P) converters $1\text{-}0 \sim 1\text{-}n$ in which data of the data signals are converted into I channel data and Q channel data, respectively. Describing the i-th channel (i=0~n), for example, data DIi and DQi converted by the S/P converter 1-i are input to respective multipliers 2-1i and 2-2i. The multipliers 2-1i and 2-2i multiply the data DIi and DQi with spreading code PNi assigned to the i-th code channel and generated by a spreading code generator 3-i to spread the spectrum. The signal whose spectrum is spread by the multiplier 2-1i is band-limited by a band-pass filter 4-1i and input to an adder 6-1. The signal whose spectrum is spread by the multiplier 2-2i is band-limited by a band-pass filter 4-2i and input to an adder 6-2. The adder 6-1 sums the signals $10 \sim \text{In}$ passed through the band-pass filters $4\text{-}10 \sim 4\text{-}1n$ and outputs a modulated signal I. The adder 6-2 sums the signals $Q0 \sim Qn$ passed through the band-pass filters $4\text{-}20 \sim 4\text{-}2n$ and outputs a modulated signal Q. The modulated signals I and Q are sent to a transmitting portion 7 and a carrier signal is quadrature-modulated with these signals, amplified by a transmitting amplifier of the transmitting portion 7 and transmitted from the antenna as electromagnetic wave.

FIG. 2 shows an example of the eye-pattern in the conventional system, with reference to which an increase of peak value produced by the synthesis performed by the adder will be described. It should be noted that, for simplicity of description, a result of synthesis of the signals I of two code channels is shown in FIG. 2. Further, it is assumed that the band-pass filters are Nyquist filters, respectively.

In FIG. 2, the sum of the signals I1 and I2 on the different code channels is the I signal and peak values VP1 and VP2 of the signals I1 and I2 appear at intermediate positions between adjacent sample points, respectively. Therefore, a peak value VP of the signal I resulting from a synthesis of two signals I1 and I2 is represented by the following equation:

$$VP = VP1 + VP2 \tag{1}$$

Therefore, if VP1 and VP2 are equal, VP becomes twice VP1. On the other hand, since a mean power value of the signal I becomes only a square root of 2, a peak factor is increased by 3 dB.

In order to solve this problem, it has been proposed to shift times at which peak values of a plurality of signals to be summed are produced. In, for example, Japanese Patent Application Laid-open No. Hei 6-244821, a pseudo random code is commonly given to all communication stations and a plurality of transmitters transmit signals to receivers by synchronizing transmitting operations of the transmitters with time differences given to the pseudo random code such that peaks of correlation values on receivers corresponding to the respective transmitters neither interfere with others nor are interfered by others.

In Japanese Patent Application Laid-open No. Hei 7-50649, the utilization efficiency of frequency is improved by assigning a series of spreading codes having small mutual correlation to a plurality of subscribers. On a transmitting side, two series of spreading codes with a time space of 1 chip between them, each of which has a self correlation function having peak value every two spreading code times (chips) and zero value at intermediate time between adjacent peak values, are produced and information codes in respective channels are spectrum-spread with these series of spreading codes and transmitted by summing the spectrum-spread information codes.

However, in each of these conventional CDMA multi-code transmitters, there is a problem that the efficiency of a transmitting amplifier is degraded and power consumption is increased. The reason for this resides in the peak factor of signal. The peak factor is a ratio of a peak level of an input signal to the transmitting amplifier to a mean level of the signal. When this ratio is large, the transmitting amplifier must maintain a linearity with respect to peak value which is large compared with the mean level and, therefore, it is necessary to have an enough back-off (ratio of a saturation level of an amplifier to a mean transmitting level thereof: represented by dB) large in an output level of the amplifier. However, when the back-off is made large, the efficiency of the amplifier is degraded. Therefore, power consumption of the device in increased.

In either of the above mentioned prior arts, the frequency utilizing efficiency is improved by assigning one and the same spreading code to a plurality of channels so that a plurality of users can utilize the spreading code, and, in order to facilitate a separation and demodulation of one of the channels by using one and the same spreading code on a receiving side, it is necessary to make the peak factor large enough to easily identify the peak value. Therefore, the above mentioned problem is indispensable.

An object of the present invention is to provide a multi-code transmitter of CDMA system, which is capable of solving the problems inherent to the prior art, by using mutually different spreading codes to make peak values of the eye-pattern smaller to thereby reduce power consumption of the transmitter.

SUMMARY OF THE INVENTION

According to the present invention, it is provided a multi-code transmitter of CDMA system which comprises spread spectrum means for spreading spectra on data signals input from a plurality of data channels with mutually different spreading codes, adder means for summing spectrum-spread baseband signals, transmitter means for modulating a carrier signal with the added baseband signals and delay means for delaying the baseband signals input to the adder means.

By delaying the spectrum-spread baseband signals differently, overlapping of peak values in the respective data channels is prevented from occurring in summing these signals.

DETAILED DESCRIPTION OF PREFERRED EMBODIMENTS

Figure 1:
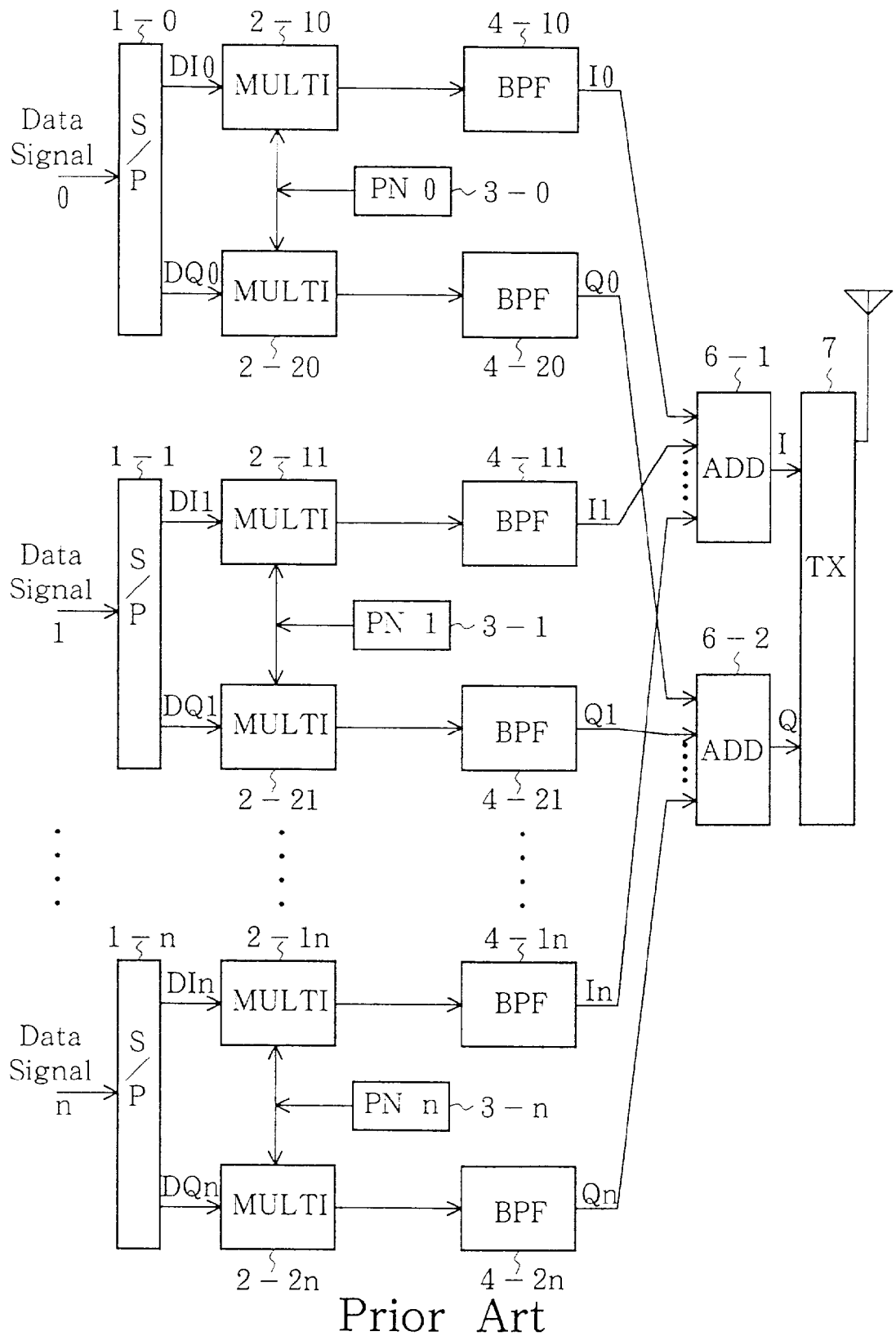
FIG. 1 is a block diagram showing a construction of a conventional CDMA multi-code transmitter.
Figure 2:
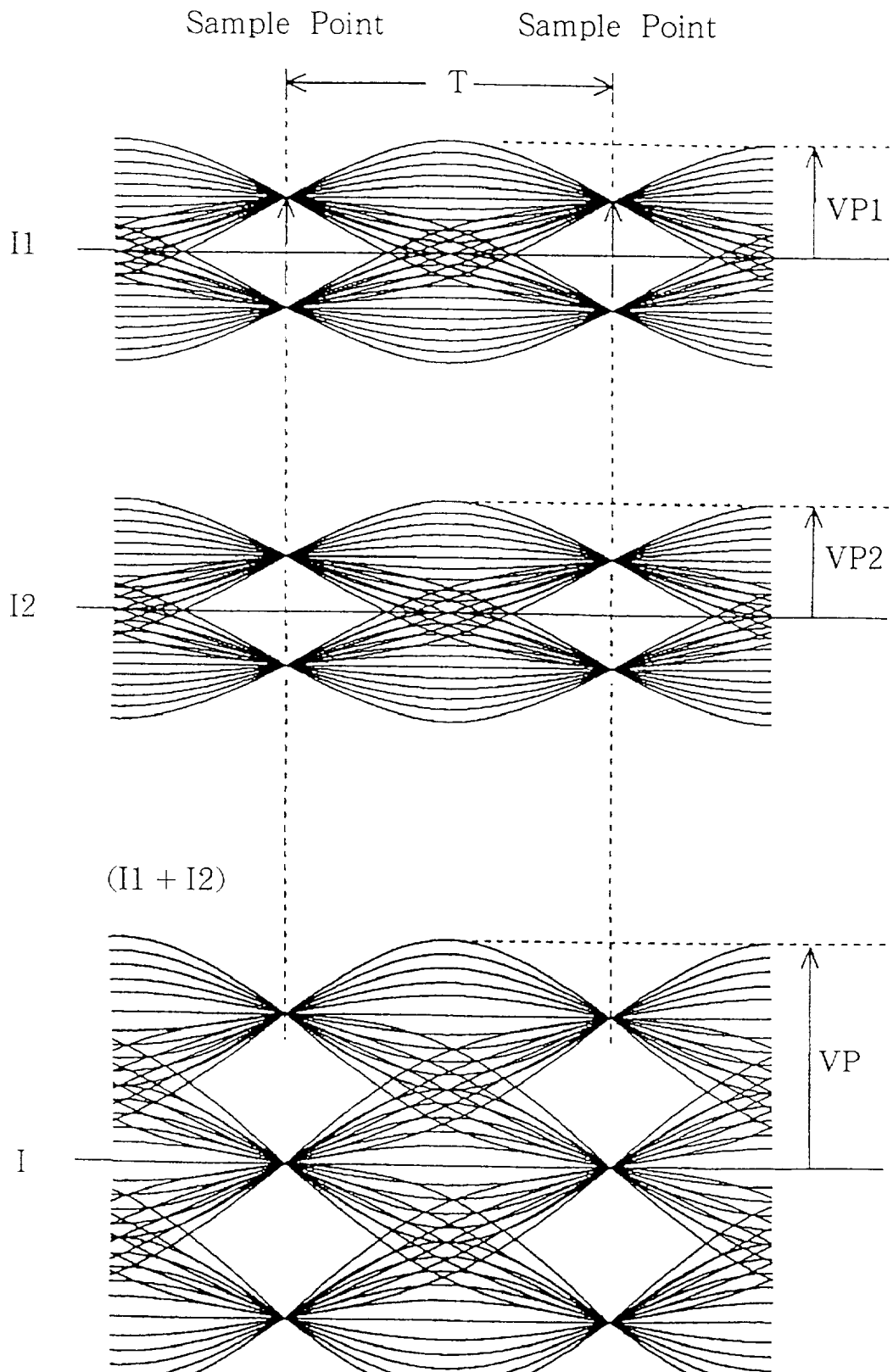
FIG. 2 shows an example of the eye-pattern in the conventional system.
Figure 3:
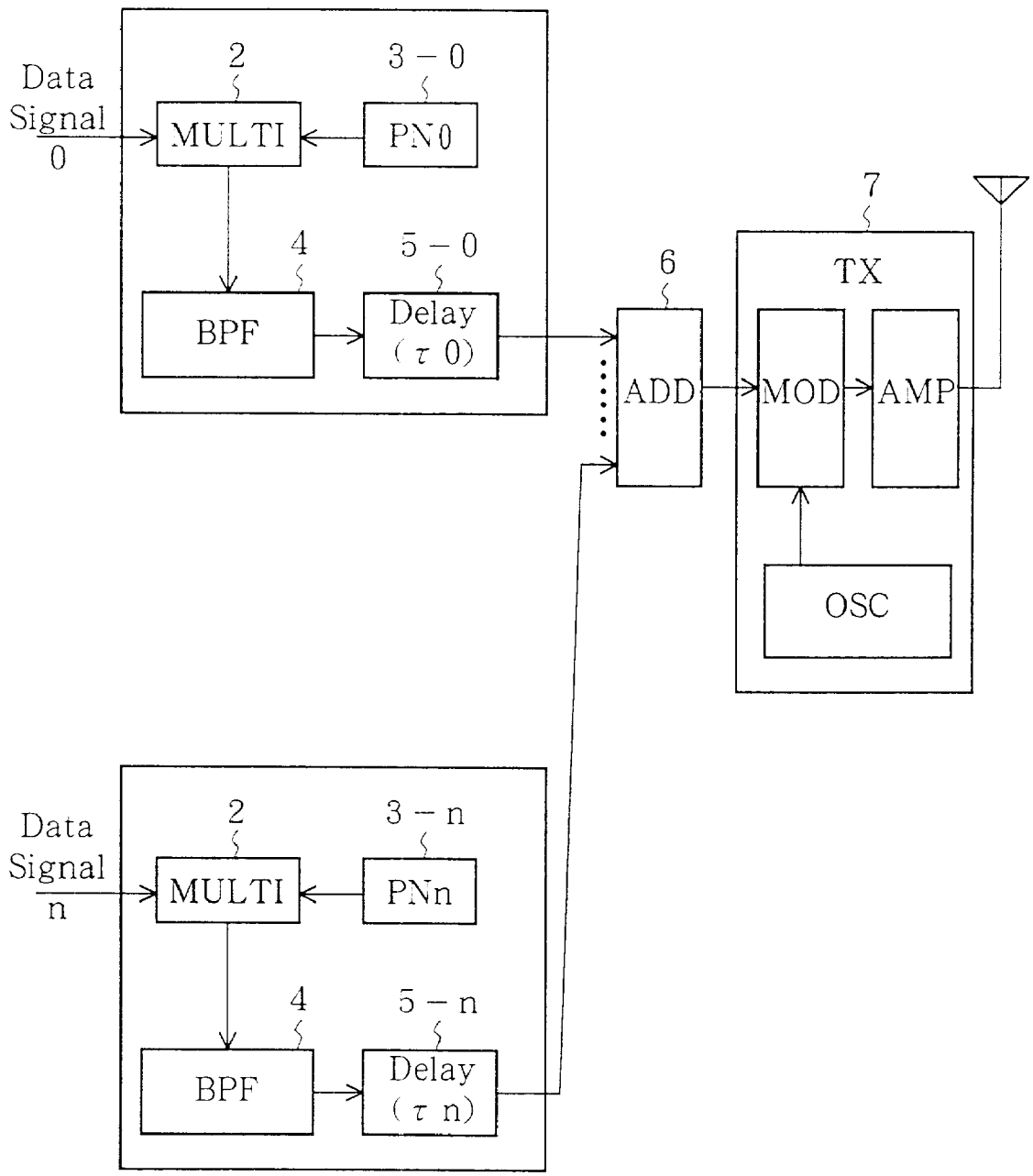
FIG. 3 is a block diagram showing a basic construction of a CDMA multi-code transmitter according to an embodiment of the present invention.

FIG. 3 is a block diagram showing a basic construction of a CDMA multi-code transmitter according to an embodiment of the present invention, in which the same constructive components as those in FIG. 1 are depicted by the same reference numerals as those used in FIG. 1, respectively.

In the CDMA multi-code transmitter shown in FIG. 3, a plurality (n+1) of baseband signal generator portions 10~1n spread spectra of data signals 0~n input from (n+1) data channels with mutually different spreading codes. Baseband signals obtained by this spectrum spreading are summed by an adder 6 and a resultant sum modulates a carrier signal by a transmitter portion 7. The modulated carrier is transmitted through an antenna. This construction is the same as the conventional construction, except the function of the baseband signal generator portions 10~1n.

Now, one (1i) of the baseband signal generator portions 10~1n will be described as an example, where i=0~n. The baseband signal generator portion 1i comprises a multiplier 2, a spreading code generator 3-i, a band-pass filter 4 and a delay circuit 5-i. The multiplier 2 generates a baseband signal different from baseband signals generated by other baseband signal generator portions by spreading spectrum on data signal i input thereto from a data channel i with a spreading code Pni which is different from other spreading codes and is supplied from the spreading code generator 3-i. The baseband signal is band-limited by the band-pass filter 4, delayed by the delay circuit 5-i having a delay time τi and output at such a timing that the baseband signals are output from all of the baseband signal generator portions 10~1n sequentially with a predetermined time interval τ. The delay circuit 5-i may be arranged between the multiplier 2 and the band-pass filter 4.

That is, the difference of the embodiment of the present invention from the conventional transmitter resides in that each baseband signal generator portion includes the delay circuit provided before or after the band-pass filter 4 to output the different baseband signals from all of the baseband signal generator portions 10~1n to the adder 6 sequentially with a predetermined time interval τ.

Figure 4:
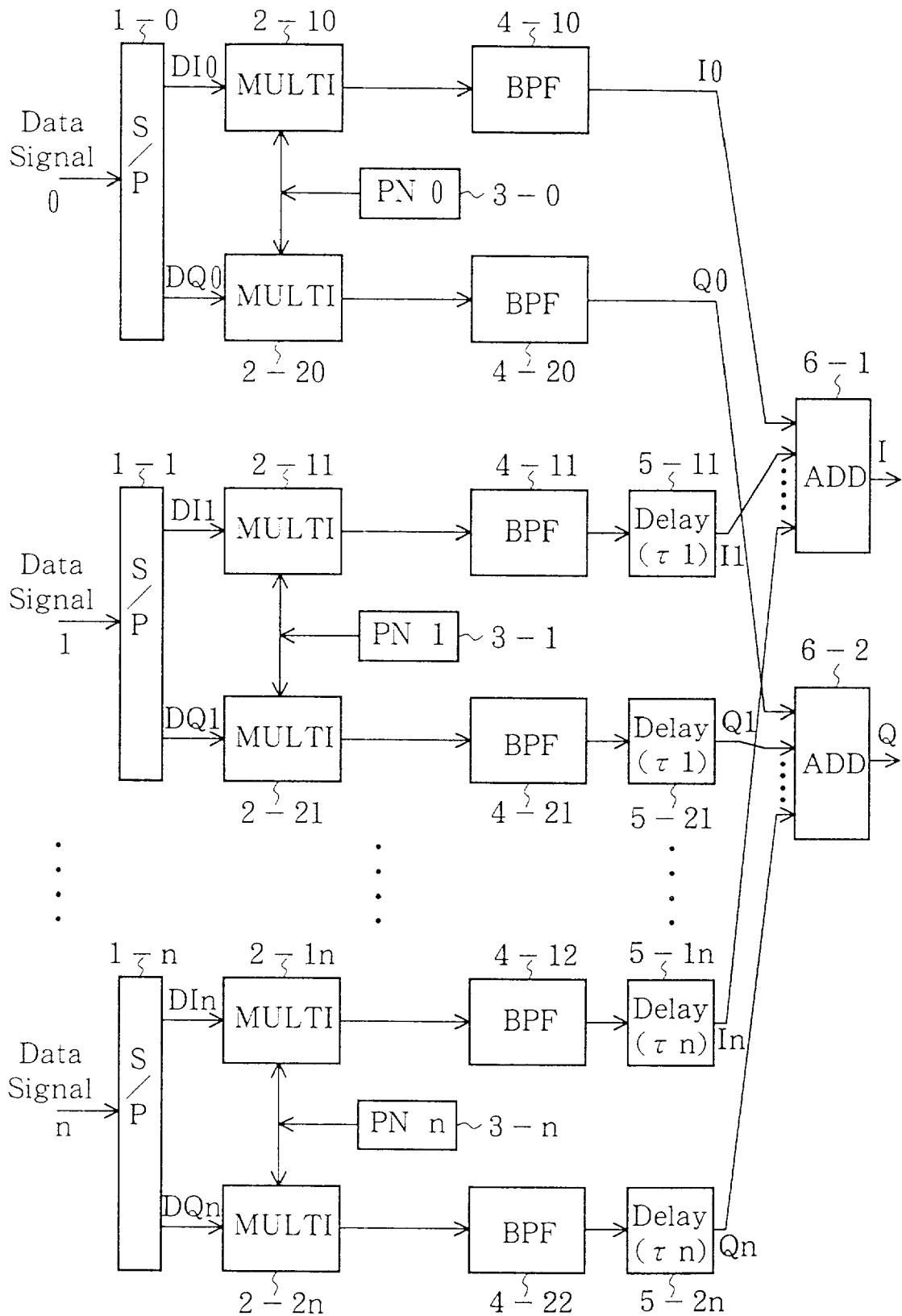
FIG. 4 is a block diagram showing a concrete example of the CDMA multi-code transmitter construction according to the embodiment of the present invention.

The present invention will be further described with reference to FIG. 4 while comparing with the conventional transmitter shown in FIG. 1. It is assumed that the Q-PSK is utilized as the modulation system for transmission.

The data signals 0~n on the respective channels are input to serial to parallel (S/P) converters 1-0~1-n and converted thereby into data of I channels and data of Q channels, respectively. For the i-th channel, data DIi and Dqi converted by the S/P converter 1-i are input to the multipliers 2-1i and 2-2i, respectively, and multiplied with the spreading code PNi generated by the spreading code generator 3-i to spread the spectra of the data. The signal output from the multiplier 2-1i is limited in frequency band by the band-pass filter 4-1i and input to the adder 6-1. On the other hand, the signal output from the multiplier 2-2i is limited in frequency band by the band-pass filter 4-2i and input to the adder 6-2. This operation of the present embodiment is the same as that of the conventional transmitter.

The signal having a frequency band limited by the band-pass filter 4-1i is input to the delay circuit 5-1i having delay time τi and the signal having a frequency band limited by the band-pass filter 4-2i is input to the delay circuit 5-2i having delay time τi. It should be noted that the delay times τ0~τn are mutually different. Further, in the embodiment shown in FIG. 4, τ0=0. That is, there is no delay circuit provided in the 0-th code channel.

The signal I0 passed through the band-pass filter 4-10 and the signals I1~In passed through the band-pass filters 4-11~4-1n and the delay circuits 5-11~5-1n are added to each other by the adder 6-1. On the other hand, the signal Q0 passed through the band-pass filter 4-20 and the signals Q1~Qn passed through the band-pass filters 4-21~4-2n and the delay circuits 5-21~5-2n are input to the adder 6-2. The adder 6-1 sums the signal I0 which is spectrum-spread and passed through the band-pass filter 4-10 and the signals I1~In which are spectrum-spread and differently delayed by the band-pass filters 4-11~4-1n and outputs a modulation signal I. The adder 6-2 sums the signal Q0 which is spectrum-spread and passed through the band-pass filter 4-20 and the signals Q1~Qn which are spectrum-spread and differently delayed by the band-pass filters 4-21~4-2n and outputs a modulation signal Q. The modulation signals I and Q are sent to the transmitter portion 7. In the transmitter portion 7, the carrier signal is quadrature-modulated with the modulation signals I and Q, amplified and transmitted through the antenna as an electromagnetic wave.

Although, in the shown circuit construction, the delay circuits 5-11~5-1n and 5-21~5-2n are arranged after the band-pass filters 4-11~4-1n and 4-21~4-2n, these delay circuits may be arranged before the band-pass filters, respectively.

Figure 5:
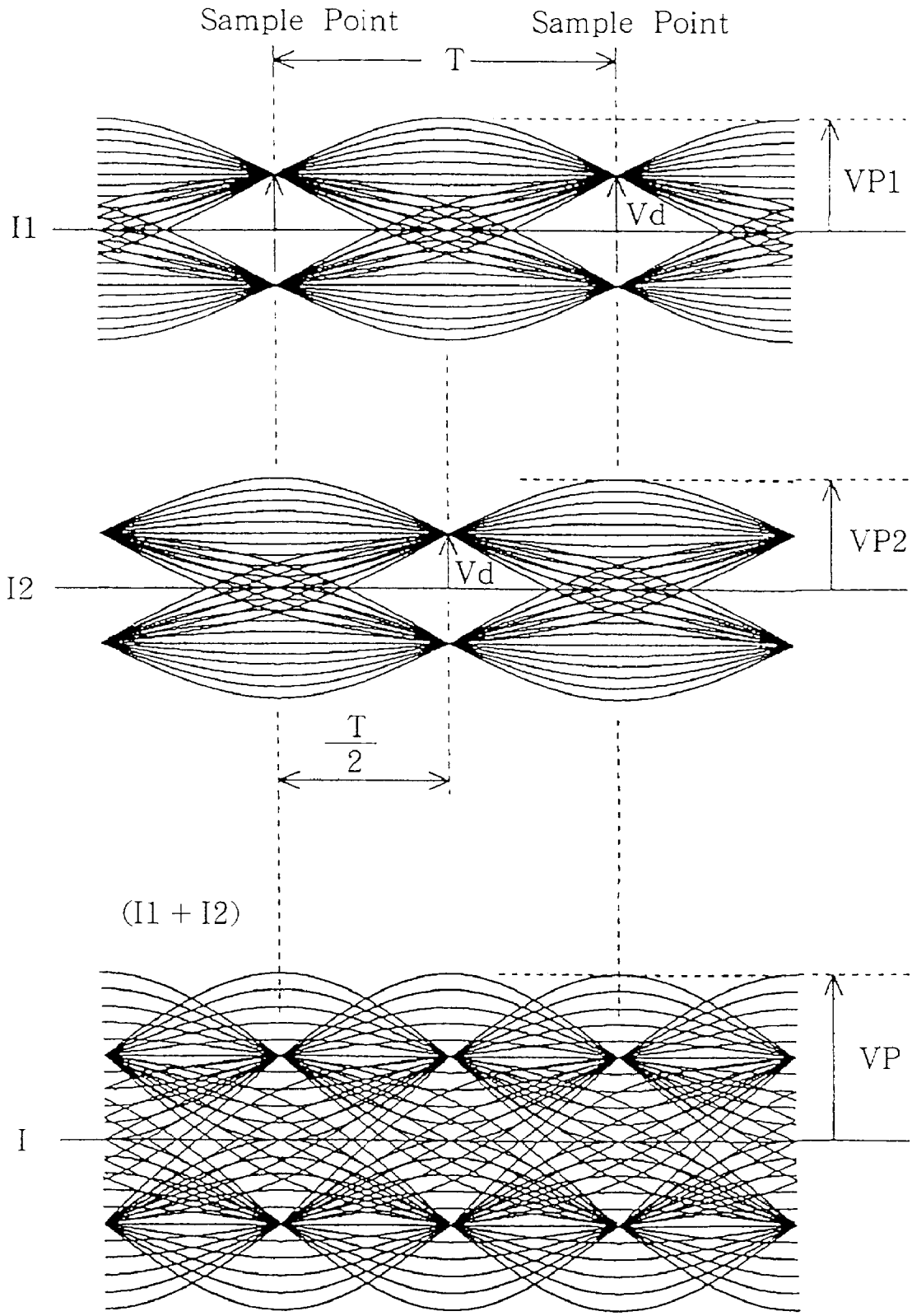
FIG. 5 shows an example of the eye-pattern obtained by the present invention.

The peak value produced by the summing operation in the adder 6 will be described with reference to FIG. 5. For simplicity of description, a sum of signals I of two code channels is shown in FIG. 5. Further, it is assumed that the band-pass filters are Nyquist filters.

The signals I1 and I2 are of different code channels and peaks of these signals, which have values VP1 and VP2, respectively, appear in intermediate points between adjacent sample points. When a phase timing of the signal I2 is delayed by a delay circuit from that of the signal I1 by a half of a distance T between adjacent sample points, that is, by a time T/2 and the signals I1 and I2 are summed, the peaks are not overlapped and the eye-pattern becomes substantially smoothed. However, since, in the CDMA system, the signals of the code channels can be separated by inverse-spreading with using mutually different spreading codes on the side of receiver, there is no functional problem.

The peak value VP of the summed signal I is represented by the following equation:

$$VP = VP1 + Vd \qquad (2)$$

where Vd is a voltage at respective sample points, that is, the maximum opening portion of the eye-pattern. Therefore, VP is apparently smaller than the sum of the peaks, VP1+VP2, in the case of the conventional system.

Although the present invention has been described with reference to the embodiment shown in the drawings, the present invention is not limited to the embodiment and any separation, distribution and/or combination of functions of the shown function blocks and/or any modification of the shown function block arrangement can be used so long as they satisfy the described functions.

As described hereinbefore, according to the present invention, it is possible to obtain a CDMA multi-code transmitter which can reduce the peak level and peak factor by eliminating the overlapping of peaks of the baseband signals for each data channel, which results from by the summation of these signals in the adder, by mutually shifting the baseband signals peaks by delaying them by different delay times.

With this construction, it is possible to reduce the back-off of the transmitter amplifier correspondingly to the peak factor to thereby improve power efficiency. Therefore, the power consumption of the CDMA multi-code transmitter according to the present invention can be reduced.

What is claimed is:

1. A CDMA multi-code transmitter comprising:

spread spectrum means for spreading spectra of data signals input from a plurality of data channels with using mutually different spreading codes to obtain baseband signals;

adder means for summing baseband signals obtained by said spectrum spreading means;

transmitting means for modulating a carrier signal with an output of said adder means and transmitting the modulated carrier signal; and means for differently delaying the baseband signals to be supplied to said adder means, such that the baseband signals are transmitted by said transmitting means at different timing.

* * * * *